United States Patent
Mukherjee

(10) Patent No.: US 11,008,855 B2
(45) Date of Patent: May 18, 2021

(54) SYSTEMS AND METHODS FOR IMAGING A PROPPANT IN A HYDRAULICALLY-FRACTURED OIL RESERVOIR

(71) Applicant: CARBO Ceramics Inc., Houston, TX (US)

(72) Inventor: Souvik Mukherjee, Katy, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 15/845,647

(22) Filed: Dec. 18, 2017

(65) Prior Publication Data

US 2019/0186257 A1    Jun. 20, 2019

(51) Int. Cl.
| | |
|---|---|
| *E21B 47/09* | (2012.01) |
| *E21B 43/26* | (2006.01) |
| *G01V 7/06* | (2006.01) |
| *G01D 5/26* | (2006.01) |
| *E21B 43/267* | (2006.01) |
| *E21B 47/06* | (2012.01) |
| *E21B 49/00* | (2006.01) |

(Continued)

(52) U.S. Cl.
CPC ............ *E21B 47/09* (2013.01); *E21B 43/267* (2013.01); *G01D 5/268* (2013.01); *G01V 7/06* (2013.01); *E21B 23/001* (2020.05); *E21B 47/06* (2013.01); *E21B 47/07* (2020.05); *E21B 49/00* (2013.01)

(58) Field of Classification Search
CPC ........ E21B 47/09; E21B 43/267; E21B 47/00; G01V 7/06
See application file for complete search history.

(56) References Cited

U.S. PATENT DOCUMENTS

| | | | |
|---|---|---|---|
| 5,120,455 A * | 6/1992 | Lunghofer ................ | B01J 2/16 166/280.2 |
| 7,360,419 B2 * | 4/2008 | French .................... | G01V 7/10 73/382 G |
| 8,527,205 B2 | 9/2013 | Legendre et al. | |

(Continued)

FOREIGN PATENT DOCUMENTS

WO    2018067120 A1    11/2017

OTHER PUBLICATIONS

International Search Report and Written Opinion for International Application No. PCT/US18/65962 dated Mar. 26, 2019.

(Continued)

*Primary Examiner* — Blake E Michener
*Assistant Examiner* — Theodore N Yao
(74) *Attorney, Agent, or Firm* — Patterson + Sheridan, LLP

(57) ABSTRACT

A method for determining a location of a proppant in a subterranean formation includes obtaining a first set of data in a wellbore using a downhole tool. The proppant is pumped into the wellbore after the first set of data is obtained. The proppant is pumped while or after the subterranean formation is fractured. A second set of data is obtained in the wellbore using the downhole tool after the proppant is pumped into the wellbore. The first set of data and the second set of data include a gravitational field measurement. The first and second sets of data are compared, and in response to the comparison, the location of the proppant in the subterranean formation is determined.

18 Claims, 9 Drawing Sheets

(51) Int. Cl.
 *E21B 23/00* (2006.01)
 *E21B 47/07* (2012.01)

(56) References Cited

U.S. PATENT DOCUMENTS

| | | | |
|---|---|---|---|
| 8,938,363 B2 | 1/2015 | Beasley et al. | |
| 9,939,591 B2 | 4/2018 | Levitt et al. | |
| 9,964,653 B2 | 5/2018 | Zhdanov | |
| 2003/0205375 A1* | 11/2003 | Wright | E21B 49/008 |
| | | | 166/250.1 |
| 2006/0070432 A1 | 4/2006 | Ander | |
| 2008/0149329 A1 | 6/2008 | Cooper et al. | |
| 2010/0147512 A1 | 6/2010 | Cramer et al. | |
| 2011/0042073 A1 | 2/2011 | Legendre et al. | |
| 2011/0185806 A1* | 8/2011 | Pfutzner | G01V 7/06 |
| | | | 73/152.54 |
| 2011/0272147 A1 | 11/2011 | Beasley et al. | |
| 2012/0152529 A1* | 6/2012 | Eick | C09K 8/80 |
| | | | 166/250.1 |
| 2012/0181020 A1* | 7/2012 | Barron | B01J 13/02 |
| | | | 166/250.1 |
| 2012/0186342 A1* | 7/2012 | Dolgin | G01V 7/00 |
| | | | 73/382 G |
| 2012/0210783 A1* | 8/2012 | Carroll | G01V 7/00 |
| | | | 73/382 G |
| 2013/0018585 A1 | 1/2013 | Zhdanov et al. | |
| 2014/0083186 A1 | 3/2014 | Levitt et al. | |
| 2014/0190686 A1* | 7/2014 | Cannan | E21B 43/25 |
| | | | 166/250.01 |
| 2015/0129203 A1* | 5/2015 | Deutch | E21B 43/11 |
| | | | 166/250.1 |
| 2015/0307773 A1* | 10/2015 | Hulseman | E21B 43/267 |
| | | | 166/280.2 |
| 2016/0041300 A1 | 2/2016 | Meyer | |
| 2016/0123082 A1* | 5/2016 | Wu | E21B 47/0228 |
| | | | 175/45 |
| 2016/0214742 A1 | 7/2016 | Carroll et al. | |
| 2017/0329043 A1 | 11/2017 | Bhongale et al. | |
| 2018/0066515 A1 | 3/2018 | Balan et al. | |
| 2018/0247003 A1 | 8/2018 | Weiss | |
| 2018/0328131 A1* | 11/2018 | McCormick | F16N 17/00 |
| 2019/0300778 A1* | 10/2019 | Nguyen | E21B 43/267 |

OTHER PUBLICATIONS

Zhang, Ping, Mohammed Badri, Harold Pfutzner, and Wael Abdallah, Feasibility of Using a Borehole Gravity Tool to Detect Fracture Systems at Reservoir Scale, SPE Middle East Oil & Gas Show and Conference, Manama, Kingdom of Bahrain, Mar. 6-9, 2017, SPE-183841-MS.

* cited by examiner

SYSTEMS AND METHODS FOR IMAGING A PROPPANT IN A HYDRAULICALLY-FRACTURED OIL RESERVOIR

TECHNICAL FIELD

The present disclosure relates to systems and methods for imaging a proppant. More particularly, the present disclosure relates to systems and methods for imaging a proppant in a hydraulically-fractured oil reservoir.

BACKGROUND

During or after a wellbore in an oil reservoir is hydraulically-fractured, a proppant may be introduced into the fractures. The proppant is a solid material (e.g., sand, treated sand, or man-made ceramic particles) that is designed to keep the fractures open. It may be desirable to determine the locations of the proppant and/or the fractures because their extents help determine the amount of hydrocarbon that can be produced from that wellbore. Currently, to determine the locations, a source (e.g., in a heel of the wellbore) may transmit an electromagnetic signal that may be received by one or more receivers at the surface. The received signal may be analyzed to determine the locations of the proppant, from which the locations of the fractures may be deduced.

However, the signals may travel a great distance through the subterranean formation, through many different types of materials, which may distort the signals and these distortions must be accounted for when inverting or analyzing the data. In addition, when a metallic casing is positioned in the wellbore, this may further distort the signals. Therefore, it would be desirable to have improved systems and methods for imaging a proppant in a hydraulically-fractured oil reservoir.

BRIEF SUMMARY

A method for determining a location of a proppant in a subterranean formation is disclosed. The method includes obtaining a first set of data in a wellbore using a downhole tool. The proppant is pumped into the wellbore after the first set of data is obtained. The proppant is pumped while or after the subterranean formation is fractured. A second set of data is obtained in the wellbore using the downhole tool after the proppant is pumped into the wellbore. The first set of data and the second set of data include a gravitational field measurement. The first and second sets of data are compared, and in response to the comparison, the location of the proppant in the subterranean formation is determined.

In another embodiment, the method includes receiving first and second sets of data obtained by a downhole tool in a wellbore. The proppant is pumped into the wellbore between when the downhole tool obtains the first and second sets of data, and the first and second sets of data include a gravitational field measurement. The first and second sets of data are compared, and in response to the comparison, the location of the proppant in the subterranean formation is determined.

In yet another embodiment, the method includes obtaining a first set of data in a wellbore using a downhole tool. The downhole tool includes a gravity gradiometer, a gravimeter, or a combination thereof. A first fluid is pumped into the wellbore to cause the subterranean formation to fracture after the first set of data is obtained. A second fluid is pumped into the wellbore after the subterranean formation is fractured. The second fluid includes the proppant, and the proppant is not coated with a material that is used to determine the location of the proppant in the subterranean formation. A second set of data is obtained in the wellbore using the downhole tool after the second fluid is pumped into the wellbore. The first set of data and the second set of data include a combination of components of the Earth's gravitational field vector and its corresponding spatial gradients. The first and second sets of data are compared. A difference field is generated based at least partially upon comparing the first and second sets of data. An inversion image is generated based at least partially upon the difference field. The location of the proppant in the subterranean formation is determined based at least partially upon the inversion image. Determining the location of the proppant includes determining whether the proppant is located within fractures in the subterranean formation.

BRIEF DESCRIPTION OF THE DRAWINGS

The present invention may best be understood by referring to the following description and accompanying drawings that are used to illustrate embodiments of the invention. In the drawings.

DETAILED DESCRIPTION

Figure 1:
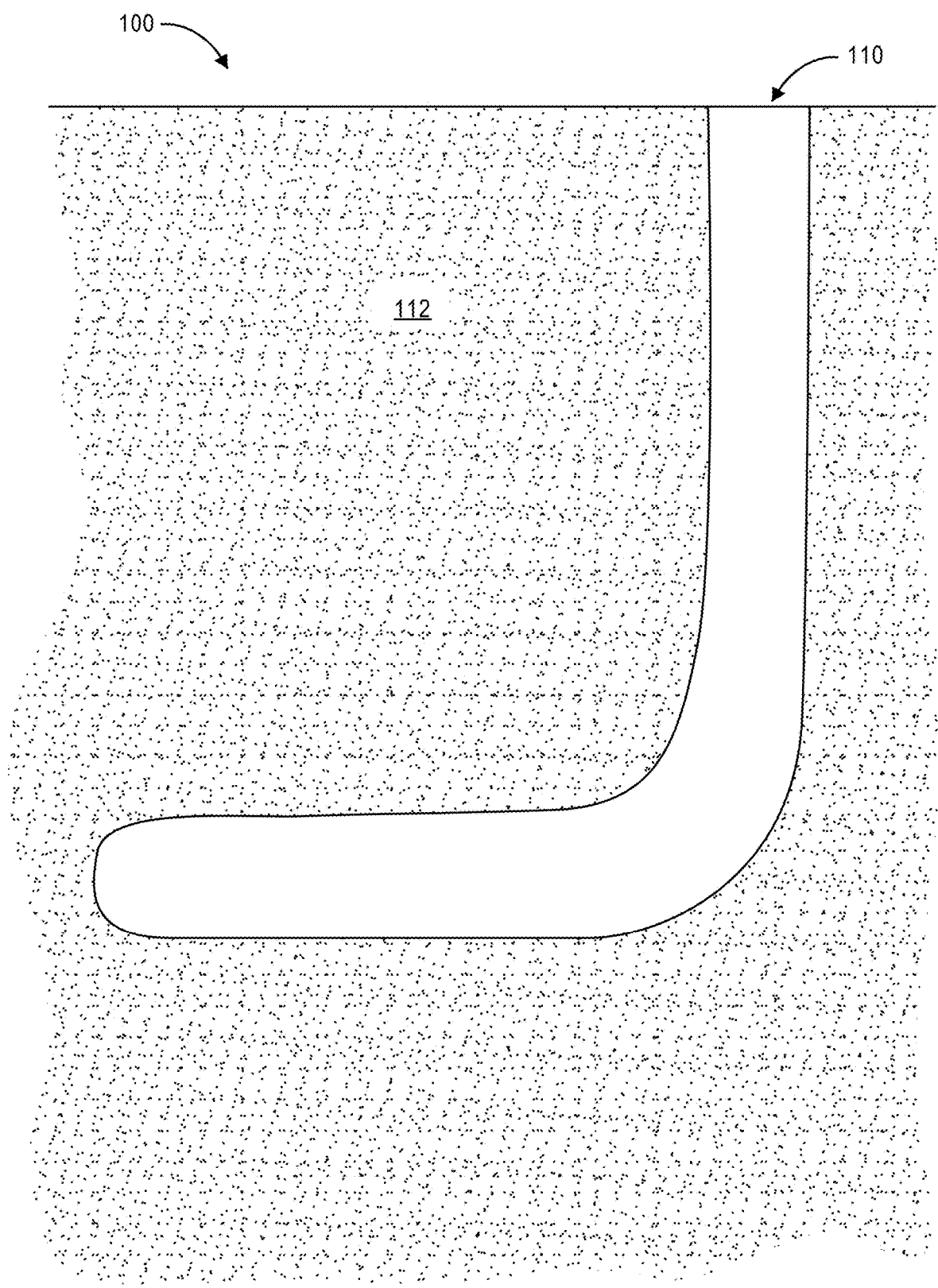
FIG. 1 is a schematic view of a wellsite including a wellbore formed in a subterranean formation, according to an embodiment.

FIG. 1 is a schematic view of a wellsite 100 including a wellbore 110 formed in a subterranean formation 112, according to an embodiment. As shown, the wellbore 110 may include a substantially vertical portion and a substantially horizontal portion. The substantially horizontal portion may be formed at an angle from about 80° to about 100° with respect to the substantially vertical portion. In other embodiments, the wellbore 110 may include the substantially vertical portion and a deviated portion that is formed at an angle from about 100° to about 170° with respect to the substantially vertical portion. In yet other embodiments, the substantially horizontal portion and/or the deviated portion may be omitted such that the wellbore 110 is only substantially vertical.

Figure 2:
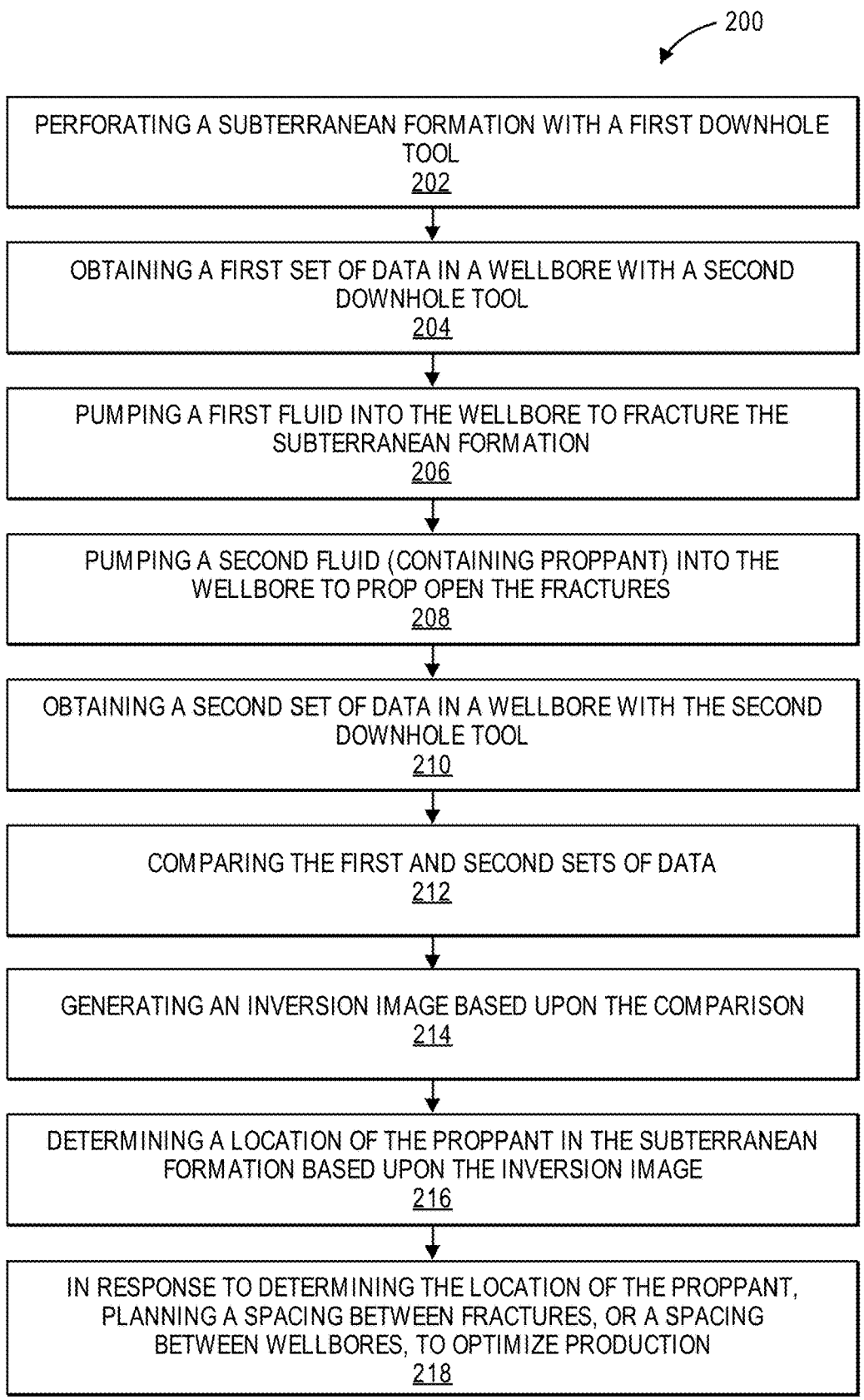
FIG. 2 is a flowchart of a method for determining a location of a proppant in the subterranean formation, according to an embodiment.
Figure 3:
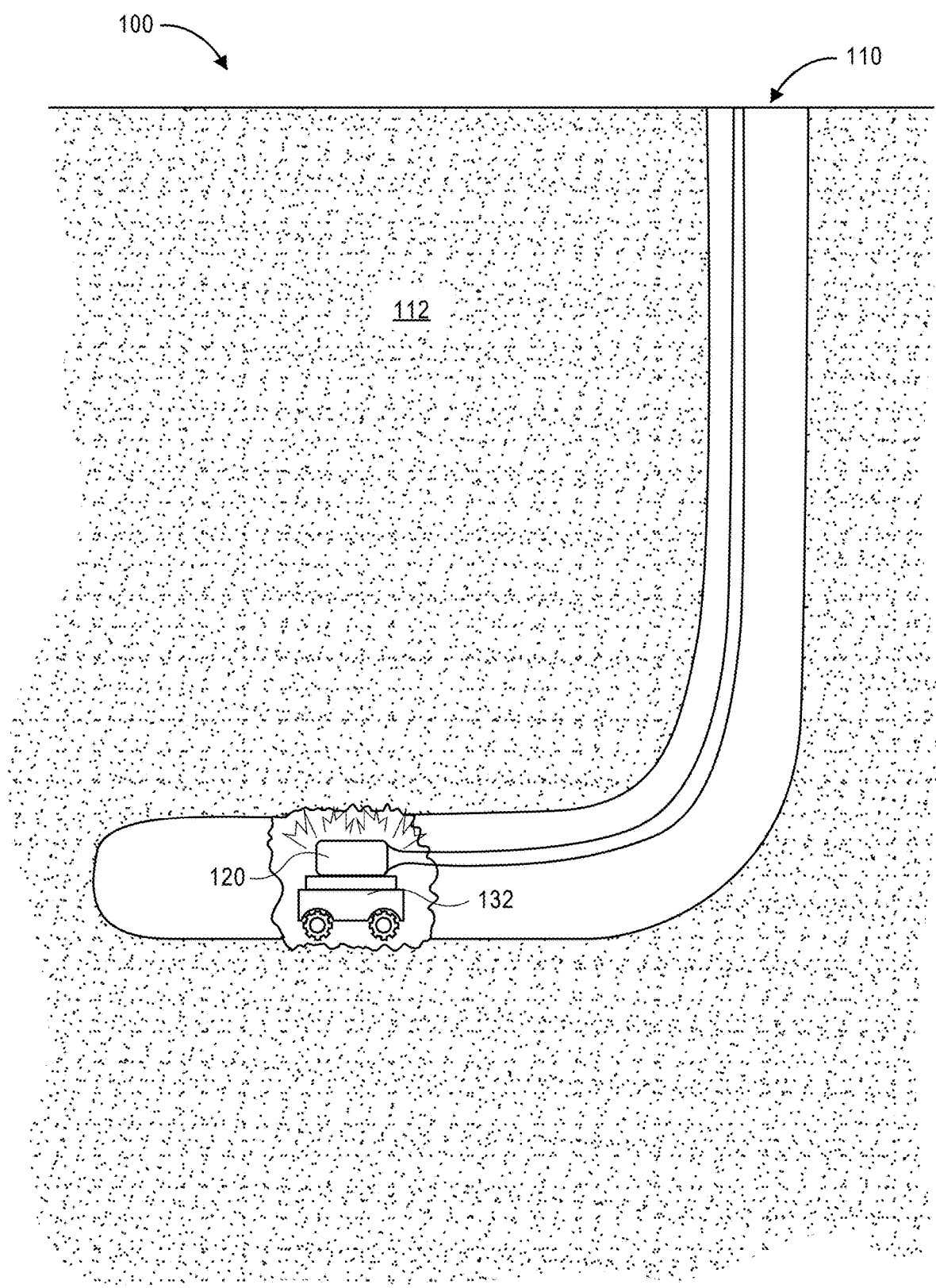
FIG. 3 is a schematic view of a first downhole tool in the wellbore forming perforations in the subterranean formation, according to an embodiment.

FIG. 2 is a flowchart of a method 200 for determining a location of a proppant in the subterranean formation 112, according to an embodiment. The method 200 may be viewed together with FIGS. 3-10, which illustrate various stages of the method 200. The method 200 may be performed on land or offshore (e.g., in deep water). The method 200 may include running a first downhole tool 120 into the wellbore 110 to perforate the subterranean formation 112, as at 202. This is shown in FIG. 3. The first downhole tool 120 may be or include a perforating gun.

Figure 4:
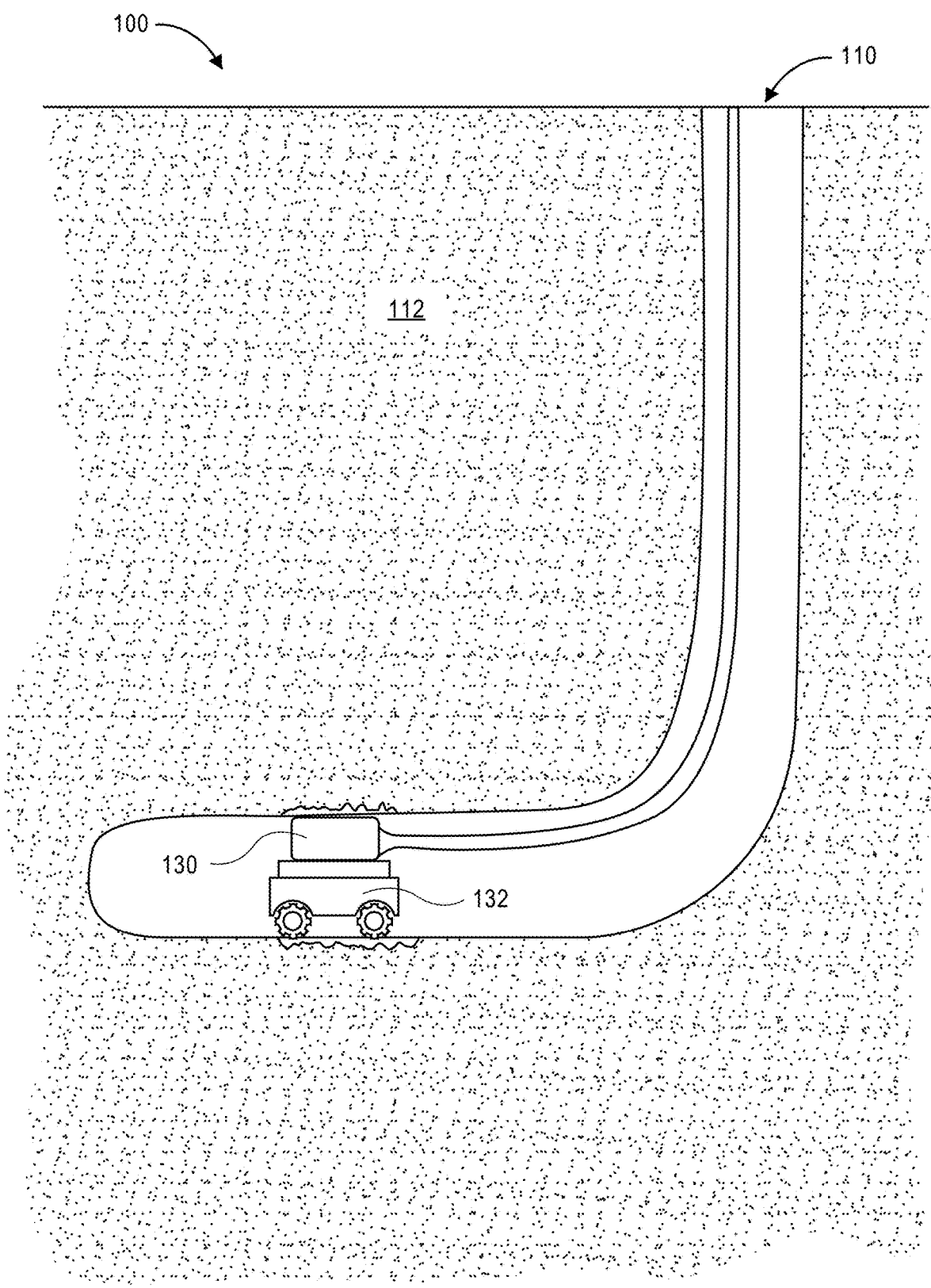
FIG. 4 is a schematic view of a second downhole tool in the wellbore obtaining a first (e.g., pre-fracture) set of data, according to an embodiment.

The method 200 may also include running a second downhole tool 130 into the (e.g., substantially horizontal portion of the) wellbore 110 to obtain a first (e.g., pre-fracture) set of data in the wellbore 110, as at 204. This is shown in FIG. 4. As shown, the first downhole tool 120 and/or the second downhole tool 130 may be run into the wellbore 110 using a tractor 132 that is configured to pull the downhole tool 120, 130 through the substantially horizontal portion of the wellbore 110. In other embodiments, the first downhole tool 120 and/or the second downhole tool 130 may be run into the wellbore 110 using a coiled tubing, a pipe string, a wireline, or the like.

In another embodiment, instead of running the second downhole tool 130 into the wellbore 110 as described above, the second downhole tool 130 may instead be coupled to (e.g., an outside of) a casing in the wellbore 110. In this embodiment, the second downhole tool 130 may be or include, for example, an optical fiber. In yet another embodiment, the second downhole tool 130 may be run into or otherwise positioned within another (e.g., a second), adjacent wellbore formed in the subterranean formation 112. In yet another embodiment, a combination of surface deployed and wellbore (either the same or different wellbore) tools may be used.

The first and second downhole tools 120, 130 may be part of the same tool or may be different tools. For example, the second downhole tool 130 may be or include a logging tool. More particularly, the second downhole tool 130 may be or include an accelerometer or a combination of accelerometers, such as a gravity gradiometer, a gravimeter, and/or a combination thereof. Thus, the data obtained/measured by the second downhole tool 130 may include a local gravitational field of the Earth (e.g., the constant downward acceleration of gravity). More particularly, the data may include small fractional changes within the Earth's gravity, caused by nearby geologic structures such as layers of rock, reservoirs of hydrocarbons, proppant inside of fractures, or a combination thereof. The Earth's gravitational field is a vector quantity pointing to the center of the earth and may be resolved locally into three spatial components, x, y, and z and its corresponding variants in non-Cartesian, orthogonal coordinate systems. The second downhole tool 130 may be capable of measuring one or more of these components. The rate of spatial variation of the individual components of the gravity vector can also be measured in different directions, which embodies the science of gravity gradiometry.

In at least one embodiment, the data measured may be either a combination of the various components (e.g., x-, y-, z- or a variation thereof including but not limited to spherical and cylindrical coordinate systems) of the Earth's gravitational field vector or a combination of the field vector and their spatial gradients. For example, the x-component of the gravity field may have a different variation gradient in the x-, y- and z-directions. These variations may be labeled gxx, gxy, and gxz. Similar variations of the gy and gz components may be recorded and labeled appropriately as gyx, gyy, gyz, gzx, gzy, and gzz. These 9 components (e.g., gxx, gxy, gxz, gyx, gyy, gyz, gzx, gzy, and gzz) may be described as including the gravity gradient tensor and may possess certain inherent properties of symmetry (e.g., gzx=gxz, gzy=gyz) and invariance (e.g., the sum gxx+gyy+gzz=0), some or all of which properties may be utilized in a manner to provide the best resolved image.

In at least one embodiment, the measurements of the gravitational field may be on the order of micro gals (e.g., micro-gravity measurements), and the change in spatial gradients may be measured in Eotvos (e.g., nano gals/m). The data may also or instead include temperature, pressure, vibration, porosity, permeability, electrical conductivity, magnetic susceptibility, or a combination thereof. In at least one embodiment, the method 200 may not rely upon seismic or electromagnetic measurements.

Figure 5:
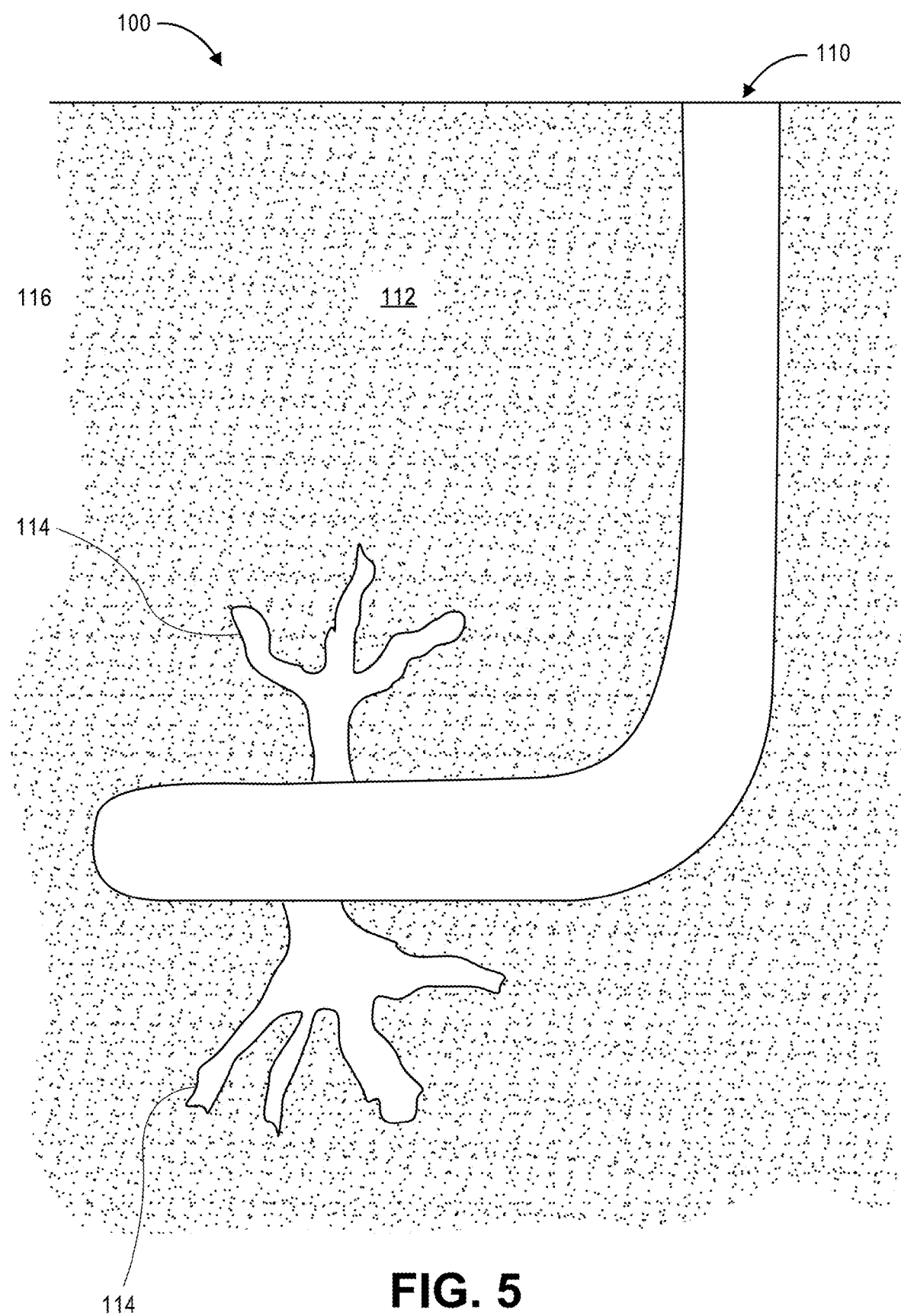
FIG. 5 is a schematic view of fractures formed in the subterranean formation, according to an embodiment.

The method 200 may also include pumping a first fluid into the wellbore 110 to (e.g., hydraulically) form fractures 114 in the subterranean formation 112, as at 206. More particularly, at least a portion of the first fluid may flow through the perforations to form the fractures 114 in the subterranean formation 112. This is shown in FIG. 5.

Figure 6:
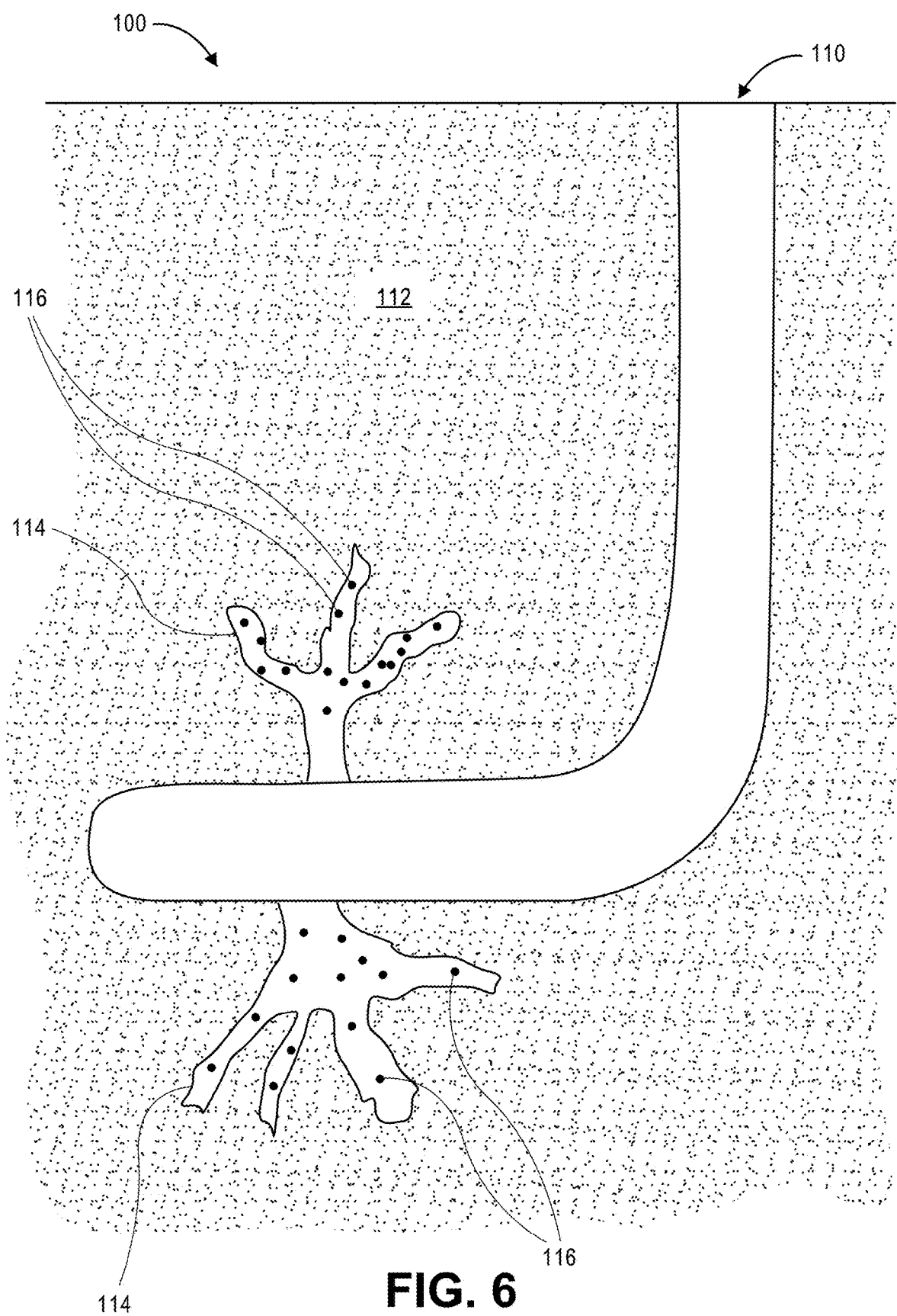
FIG. 6 is a schematic view of proppant introduced into the fractures in the subterranean formation, according to an embodiment.

The method 200 may also include pumping a second fluid into the wellbore 110, as at 208. The second fluid may be pumped after the first fluid. The second fluid may include proppant 116, which may be or include solid particles (e.g., sand, treated sand, or ceramic materials) that are designed to keep the fractures 114 open. This is shown in FIG. 6. In one or more embodiments, the proppant 116 can be or include any suitable proppant including conventional ceramic proppant, resin-coated proppant, detectable proppant and the like. In such embodiments, the proppant 116 may be coated with metals or metallic alloys and compounds including, but not limited to, metallic sulfides, coke breeze, graphene, etc. Although not shown, in another embodiment, the second fluid may be omitted, and the proppant 116 may be dispersed within the first fluid that is used to form the fractures 114. In at least one embodiment, the proppant 116 may not be coated with a material that is used to determine the location of the proppant 116 in the subterranean formation 112. For example, the proppant 116 may not be coated with metals or metallic alloys and compounds including, but not limited to, metallic sulfides, coke breeze, graphene, etc.

Figure 7:
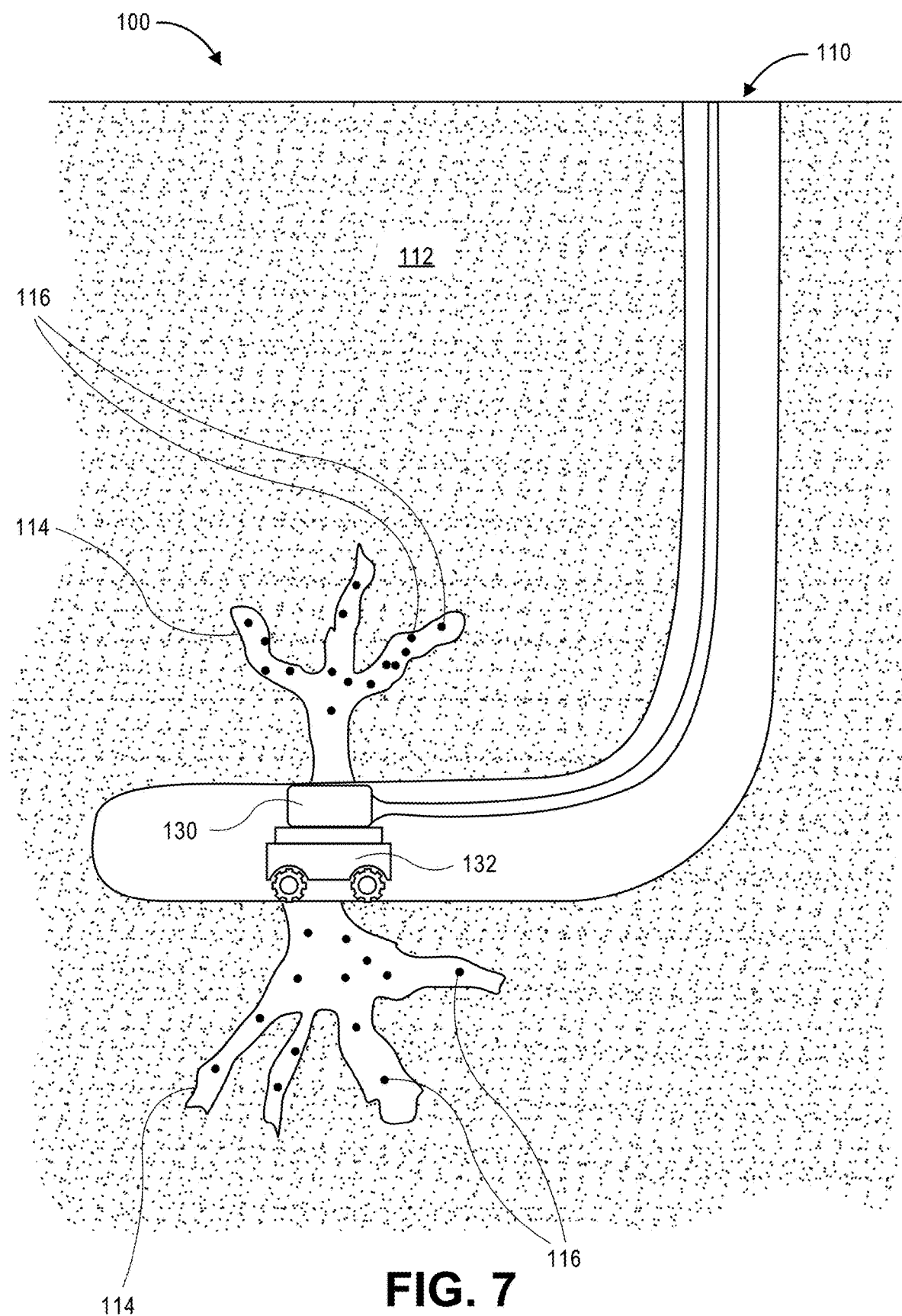
FIG. 7 is a schematic view of the second downhole tool in the wellbore obtaining a second (e.g., post-fracture) set of data, according to an embodiment.

The method 200 may also include running the second downhole tool 130 back into the (e.g., substantially horizontal portion of the) wellbore 110 to obtain a second (e.g., post-fracture) set of data in the wellbore 110, as at 210. This is shown in FIG. 7. As described above, in another embodiment, instead of running the second downhole tool 130 into the wellbore 110, the second downhole tool 130 may instead be coupled to (e.g., an outside of) a casing in the wellbore 110, or the second downhole tool 130 may be run into or otherwise positioned within another (e.g., a second), adjacent wellbore. The second (e.g., post-fracture) set of data may include the same type(s) of measurements as the first (e.g., pre-fracture) set of data.

The method 200 may also include comparing the first (e.g., pre-fracture) set of data and the second (e.g., post-fracture) set of data, as at 212. For example, the introduction of the proppant 116 may cause changes in one or more properties (e.g., density) of the subterranean formation 112, and the comparison of the first and second data sets may be used to determine changes in the gravity field as well as its gradients in response to the changed density of the subterranean formation 112. The Earth's gravitational field may be sensitive to changes in density in bulk geologic formations. However, the sensitivity may vary inversely with the square of the distance of the source of change (e.g., the proppant 116) to the point of measurement (e.g., the second downhole tool 130), and be directly proportional to the mass of the entity (e.g., the proppant 116) where the change is occurring.

As noted above, the casing (if present) and the ambient geology may cause distortion in conventional measurement techniques. However, because the gravity field response is an addition of the constituent density elements in the Earth, the response of the casing and ambient geology may be diminished upon the comparison (e.g., subtraction) of the first set of data from the second set of data, or vice versa, while the response of the propped reservoir volume becomes evident. An example of a comparison of the first and second sets of data is shown in FIGS. 8 and 9.

Figure 8:
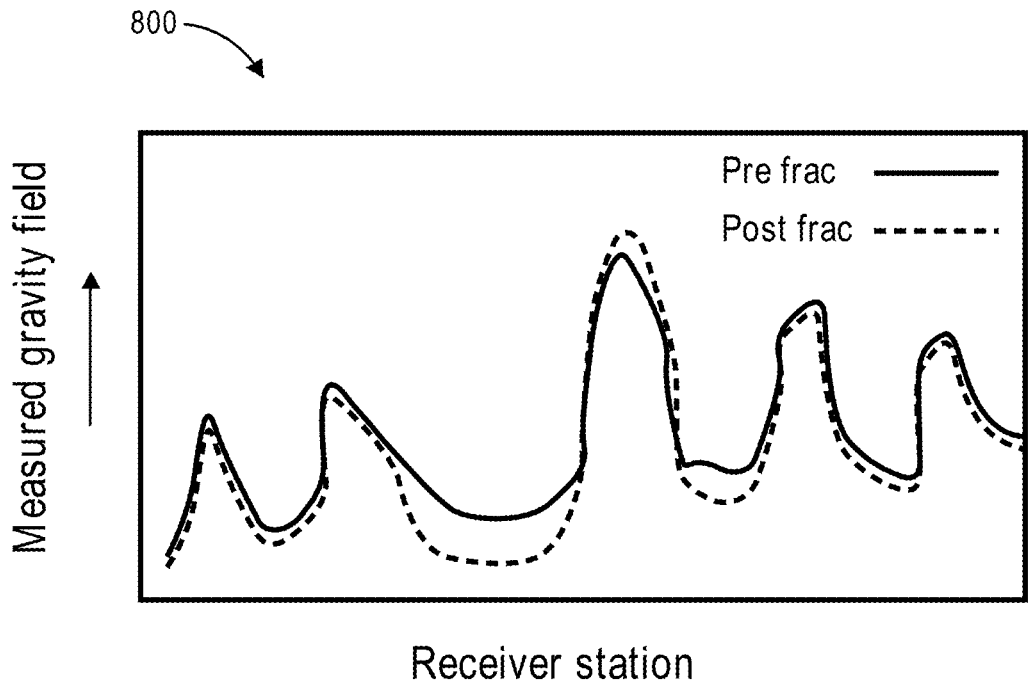
FIG. 8 is a graph showing the first (e.g., pre-fracture) and second (e.g., post-fracture) sets of data, according to an embodiment.

FIG. 8 is a graph 800 showing the first (e.g., pre-fracture) set of data 810 and the second (e.g., post-fracture) set of data 820, according to an embodiment. The X-axis represents the position number of a sensor at which a measurement was made, which in geophysical parlance is often called a receiver station, and the Y-axis represents the gravity field measured by the second downhole tool 130.

Figure 9:
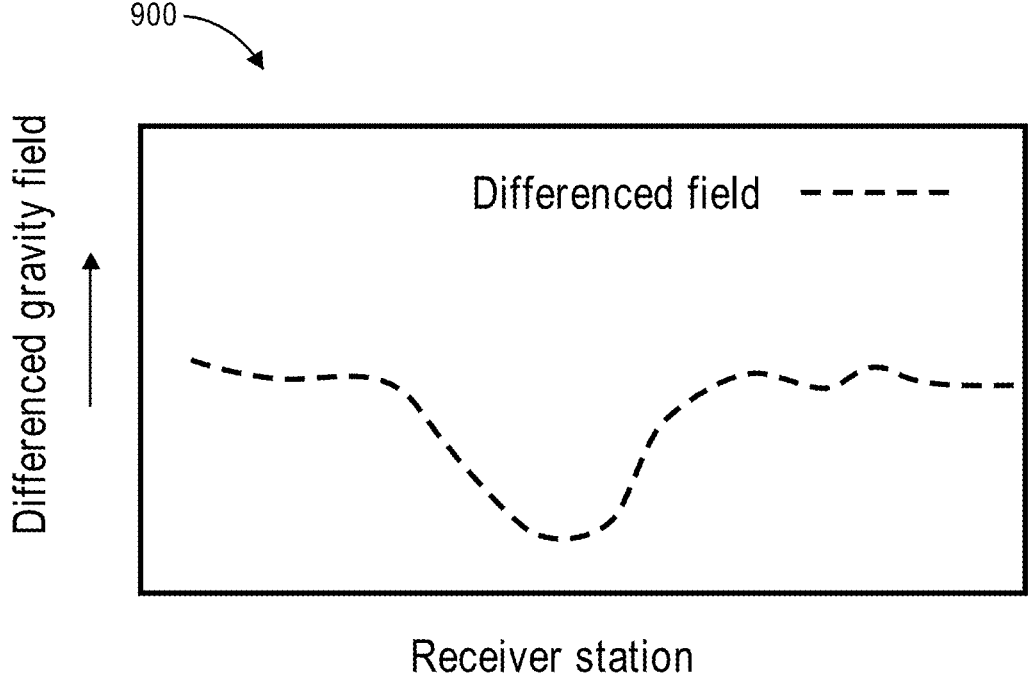
FIG. 9 is a graph showing the difference between the first (e.g., pre-fracture) and second (e.g., post-fracture) sets of data, according to an embodiment.

FIG. 9 is a graph 900 showing a difference field 910 between the first (e.g., pre-fracture) set of data 810 and the second (e.g., post-fracture) set of data 820, according to an embodiment. The difference field 910 may be determined by subtracting the first set of data from the second set of data, or vice versa. By making measurements of the gravitational field or its gradients, before and after the proppant 116 is introduced, the difference field 910 may be dominantly sensitive to the mass of the injected proppant 116. Utilization of geophysical inversion techniques can then lead to imaging the distribution of the proppant 116.

Figure 10:
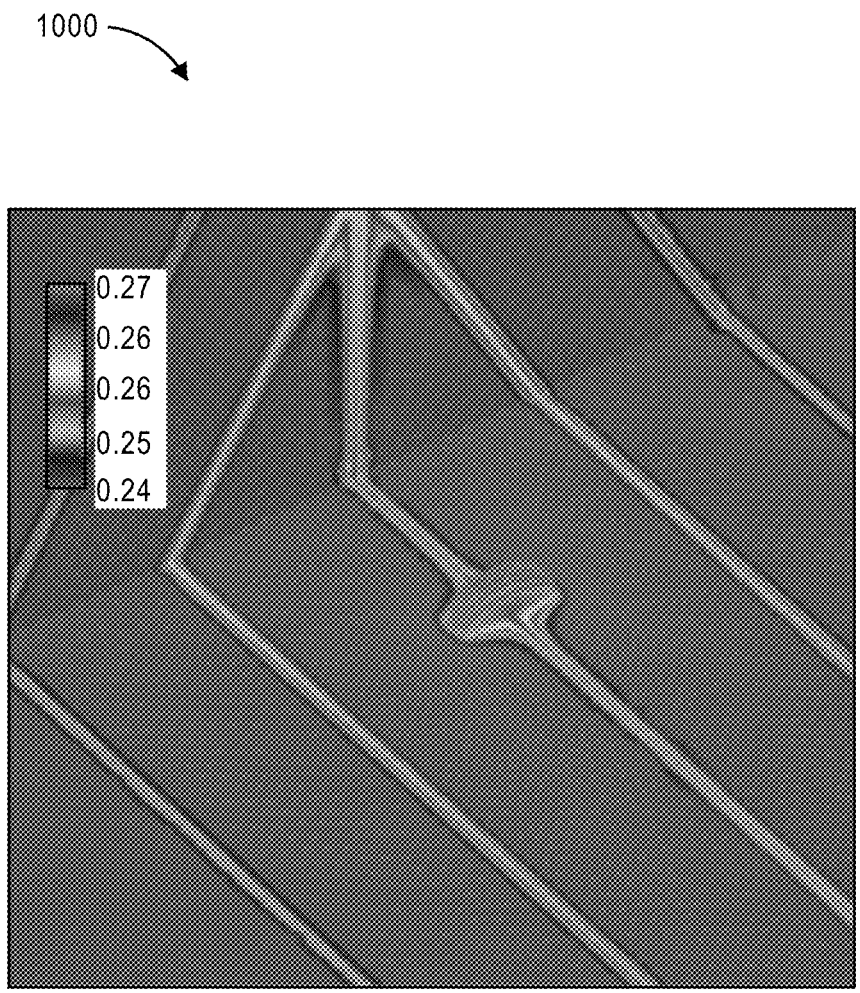
FIG. 10 is an inversion image generated using the difference between the first (e.g., pre-fracture) and second (e.g., post-fracture) sets of data obtained from electromagnetic measurements.

Returning to FIG. 2, the method 200 may also include generating an inversion (propped reservoir volume) image using the difference field 910, as at 214. An example of inversion image generated from a direct current (DC) forward problem is shown in FIG. 10. The image 1000 in FIG. 10 embodies the elevated electrical properties of the casing and the fractures filled by electrically-conductive proppants. The DC forward problem may be analogous to the gravity problem and can be adapted to model the response of the gravity field and its gradients. When the gravitational (or its gradient) field are inverted, the image generated therefrom will mainly contain the location of the proppant-filled fracture, which will stand out because of its contrast in density, while the strong linear features embodying the casing, as shown in FIG. 10, will not be present. The response of the individual fractures 114 may be modeled utilizing property allocation in the finite element method.

The method 200 may also include determining a location of the proppant 116 in the subterranean formation 112 based upon the comparison of the first and second sets of data and/or the inversion image 1000, as at 216. The method 200 may also include planning (and executing) the spacing of fractures, or the spacing between lateral wells, in order to optimize production, as at 218. The planning and/or executing may include determining where to drill additional wellbores, where to create perforations in the subterranean formation 112, the type of proppant used, etc. The image 1000 can also serve as an input to short-, mid-, and long-term production forecast models.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

What is claimed is:

1. A method for determining a location of a proppant in a subterranean formation, comprising:
   obtaining a first set of data in a wellbore using a downhole tool;
   pumping the proppant into the wellbore after the first set of data is obtained, wherein the proppant is pumped while or after the subterranean formation is fractured, wherein the proppant is sand or ceramic proppant, and wherein the proppant is not coated with a material configured to determine the location of the proppant in the subterranean formation;
   obtaining a second set of data in the wellbore using the downhole tool after the proppant is pumped into the wellbore, wherein the first set of data and the second set of data comprise a gravitational field measurement;
   obtaining a difference field by subtracting the first set of data from the second set of data;
   determining the location of the proppant in the subterranean formation by inverting the difference field; and
   generating an inversion image of the proppant by inverting the difference field, wherein generating the inversion image comprises modeling a response of individual fractures utilizing a finite element method.

2. The method of claim 1, further comprising running the downhole tool into a portion of the wellbore using a tractor prior to obtaining the first set of data, the second set of data, or both.

3. The method of claim 1, wherein the downhole tool is coupled to an outside of a casing in the wellbore, and wherein the downhole tool comprises an optical fiber.

4. The method of claim 1, further comprising:
   pumping a first fluid into the wellbore to cause the subterranean formation to fracture; and
   pumping a second fluid into the wellbore after the subterranean formation is fractured, wherein the second fluid comprises the proppant.

5. The method of claim 1, wherein the downhole tool comprises a gravity gradiometer, a gravimeter, or a combination thereof.

6. The method of claim 1, further comprising determining changes in a gravitational field and corresponding gradients in response to comparing the first and second sets of data.

7. The method of claim 1, wherein determining the location of the proppant in the subterranean formation does not rely upon seismic or electromagnetic measurements.

8. The method of claim 1, wherein the proppant is ceramic proppant, and wherein the ceramic proppant comprises sintered kaolin and/or sintered bauxite.

9. The method of claim 1, further comprising planning a spacing of additional fractures in response to determining the location of the proppant in the subterranean formation.

10. A method for determining a location of a proppant in a subterranean formation, comprising:
    receiving a first set of data obtained by a gravity gradiometer disposed in a wellbore proximate to a perforation in the subterranean formation;

placing the proppant into a fracture extending from the perforation after the first set of data is obtained, wherein the proppant is sand or ceramic proppant, and wherein the proppant is not coated with a material configured to determine the location of the proppant in the subterranean formation;

receiving a second set of data obtained by a gravity gradiometer disposed in the wellbore proximate to the perforation, wherein the first and second sets of data comprise a gravitational field measurement on the order of micro gals or nano gals;

obtaining a difference field by subtracting the first set of data from the second set of data; and determining the location of the proppant in the subterranean formation by inverting the difference field; and generating an inversion image of the proppant by inverting the difference field, wherein generating the inversion image comprises modeling a response of individual fractures utilizing a finite element method.

11. The method of claim 10, further comprising determining changes in a gravitational field and gradients (gxx, gxy, gxz, gyx, gyy, gyz, gzx, gzy, and gzz) corresponding to x-, y-, and z-components, respectively, of the gravitational field in response to obtaining the difference field.

12. The method of claim 10, wherein determining the location of the proppant in the subterranean formation does not rely upon seismic or electromagnetic measurements.

13. The method of claim 10, wherein the proppant is ceramic proppant, and wherein the ceramic proppant comprises sintered kaolin and/or sintered bauxite.

14. A method for determining a location of a proppant in a subterranean formation, comprising:

obtaining a first set of data in a wellbore using a downhole tool, wherein the downhole tool comprises a gravity gradiometer;

pumping a first fluid into the wellbore to cause the subterranean formation to fracture after the first set of data is obtained;

pumping a second fluid comprising the proppant into the wellbore after the subterranean formation is fractured to provide a proppant-filled fracture, wherein the proppant is sand that is not coated with a material that is used to determine the location of the proppant in the subterranean formation;

obtaining a second set of data in the wellbore using the downhole tool after the second fluid is pumped into the wellbore, wherein the first set of data and the second set of data comprise a combination of x-, y-, and z-components of the Earth's gravitational field vector and spatial gradients (gxx, gxy, gxz, gyx, gyy, gyz, gzx, gzy, and gzz) corresponding to the x-, y-, and z-components, respectively, of the Earth's gravitational field vector;

subtracting the first set of data from the second set of data to obtain an observed change in the spatial gradients measured in Eotvos caused by a difference in a density of the sand contained in the proppant-filled fracture and a density of the subterranean formation;

generating a difference field based upon the observed change in spatial gradients measured in Eotvos;

generating an inversion image of the proppant by inverting the difference field, wherein generating the inversion image comprises modeling a response of individual fractures utilizing a finite element method; and determining the location of the proppant in the subterranean formation based at least partially upon the inversion image, wherein determining the location of the proppant comprises determining whether the proppant is located within fractures in the subterranean formation.

15. The method of claim 14, further comprising running the downhole tool into a portion of the wellbore using a tractor prior to obtaining the first set of data, the second set of data, or both.

16. The method of claim 14, wherein the downhole tool is coupled to an outside of a casing in the wellbore, and wherein the downhole tool comprises an optical fiber.

17. The method of claim 14, wherein determining the determining the location of the proppant in the subterranean formation does not rely upon seismic or electromagnetic measurements.

18. The method of claim 17, further comprising planning a spacing of additional fractures in response to determining the location of the proppant in the subterranean formation.

* * * * *